(12) United States Patent
Sarkar et al.

(10) Patent No.: US 12,307,380 B2
(45) Date of Patent: May 20, 2025

(54) AUTOMATED PLACEMENT OF OBJECTS IN BINS USING LOOK AHEAD INFORMATION BY VIRTUAL SORTING AND PACKING

(71) Applicant: Tata Consultancy Services Limited, Mumbai (IN)

(72) Inventors: Chayan Sarkar, Kolkata (IN); Marichi Agarwal, Kolkata (IN); Aniruddha Singhal, Noida (IN); Rajesh Sinha, Noida (IN); Ankush Ojha, Noida (IN); Supratim Ghosh, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 641 days.

(21) Appl. No.: 17/661,852

(22) Filed: May 3, 2022

(65) Prior Publication Data
US 2023/0124552 A1    Apr. 20, 2023

(30) Foreign Application Priority Data
Sep. 30, 2021 (IN) .............................. 202121044839

(51) Int. Cl.
*G06N 5/01* (2023.01)
*B65G 1/137* (2006.01)
*G06Q 10/04* (2023.01)
*G06Q 10/087* (2023.01)

(52) U.S. Cl.
CPC .............. *G06N 5/01* (2023.01); *B65G 1/1371* (2013.01); *B65G 1/1373* (2013.01); *G06Q 10/04* (2013.01); *G06Q 10/087* (2013.01)

(58) Field of Classification Search
CPC ...... G06N 5/01; B65G 1/1371; B65G 1/1373; G06Q 10/087; G06Q 10/04
See application file for complete search history.

(56) References Cited

PUBLICATIONS

Li et al., ("A Three-Dimensional Adaptive PSO-Based Packing Algorithm for an IoT-Based Automated e-Fulfillment Packaging System" Published Apr. 10, 2017—(Total 18 pages) (Year: 2017).*
Verma et al., ("A Generalized Reinforcement Learning Algorithm for Online 3D Bin-Packing" Published Jul. 1, 2020—(Total 9 pages) (Year: 2020).*
Zhao et al., ("Online 3D Bin Packing with Constrained DeepReinforcement Learning" Published May 18, 2021—(Total 4 pages (Year: 2021).*

(Continued)

*Primary Examiner* — Quoc A Tran
(74) *Attorney, Agent, or Firm* — FINNEGAN, HENDERSON, FARABOW, GARRETT & DUNNER LLP

(57) ABSTRACT

Online 3-dimensional bin packing problem (O3D-BPP) is getting renewed prominence due to the industrial automation brought by Industry 4.0. However, due to limited attention in the past and its challenging nature, a good approximate technique is in scarcity as compared to 1D or 2D problems. Present disclosure provides system and method that considers real-time O3D-BPP of cuboidal boxes with partial information (look-ahead) in an automated robotic sorting center. System presents two rolling-horizon mixed-integer linear programming (MILP) cum-heuristic based algorithms wherein a framework is provided that adapts and improves performance of BP heuristics by utilizing information in an online setting with look-ahead.

18 Claims, 4 Drawing Sheets

(56) References Cited

PUBLICATIONS

Hang Zhao et al., "Online 3D Bin Packing with Constrained Deep Reinforcement Learning," Machine Learning, Mar. 2021, Arxiv, https://arxiv.org/pdf/2006.14978.pdf.

Fabian Dunke et al., Online Optimization with Lookahead, Operational Research, Jul. 2014, KIT, https://publikationen.bibliothek.kit.edu/1000042132/3159806.

Hakim Akeb, "A Look-Ahead-Based Heuristic for Packing Spheres into a Bin: The Knapsack Case Title of the item: Procedia Computer Science," Dec. 2015, pp. 652-661, Elsevier, https://www.researchgate.net/publication/283953983_A_Look-Ahead-Based_Heuristic_for_Packing_Spheres_into_a_Bin_The_Knapsack_Case/link/5697564f08aea2d74374ca41/download.

\* cited by examiner

AUTOMATED PLACEMENT OF OBJECTS IN BINS USING LOOK AHEAD INFORMATION BY VIRTUAL SORTING AND PACKING

PRIORITY CLAIM

This U.S. patent application claims priority under 35 U.S.C. § 119 to: India Application No. 202121044839, filed on Sep. 30, 2021. The entire contents of the aforementioned application are incorporated herein by reference.

TECHNICAL FIELD

The disclosure herein generally relates to sorting and packing mechanism of objects for placement, and, more particularly, to automated placement of objects in bins using look ahead information by virtual sorting and packing.

BACKGROUND

With the advent of industrial robotics, automated sorting and packaging has received a lot of attention. Packaging problems arise in various industries such as logistics, retail, e-commerce, postal service, etc. One of the main tasks in an automated sorting center involves packing an incoming stream of boxes into large containers or bins in real-time with a high packing efficiency. This task is an evolved version of the online 3-dimensional bin packing problem (3D-BPP) where a robot/robotic arm has to make decisions in a quick time to pick up a box from the conveyor and place it in its final position within a bin. These bins are then closed and sent to various destinations.

The problem of packing boxes optimally into a large container, also known as bin-packing is well known to be nondeterministic polynomial time hard (NP-hard) even in one dimension in the offline setting. In the offline 3-D setting, the information about the dimensions of all the boxes to be packed is available a priori. A number of fast and nearly optimal heuristics are available for offline bin packing such as best-fit, first-fit, floor/column building, etc. (e.g., "X. Zhao, J. A. Bennell, T. Bektas, and K. Dowsland, "A comparative review of 3d container loading algorithms." International Transactions in Operational Research, vol. 23, no. 1-2, pp. 287-320, 2010.—referred as Zhao et al.", "B. Mahvash, A. Awasthi, and S. Chauhan, "A column generation-based heuristic for the three-dimensional bin packing problem with rotation," Journal of the Operational Research Society, pp. 1-13, 2017.—referred as Mahvash et al.", and "S. Elhedhli, F. Gzara, and B. Yildiz, "Three-dimensional bin packing and mixed-case palletization," INFORMS Journal of Optimization, vol. 1, no. 4, pp. 323-352, 2019.— referred as Elhedhli et al."), including some robotic packing systems (e.g., "S. Martello, D. Pisinger, D. Vigo, D. E. Boef, and J. Korst, "Algorithm 864: General and robot-packable variants of the three-dimensional bin packing problem," ACM Transactions on Mathematical Software, vol. 33, no. 1, pp. 7—es, 2007.—referred as Martello et al.", "D. E. Boef, J. Korst, S. Martello, D. Pisinger, and D. Vigo, "A note on robot-packable and orthogonal variants of the three-dimensional bin packing problem," in Diku-rapport 03/02. n, 2003.—referred as Boef et al.").

On the other hand, in the online setting, the packer has information about only the next upcoming box and thus, has to work with this partial information to obtain tight and efficient packing arrangement, therefore, making the problem much harder. This problem has received attention in the past (e.g., "H. I. Christensen, A. Khan, S. Pokutta, and P. Tetali, "Approximation and online algorithms for multidimensional bin packing: A survey," Computer Science Review, vol. 24, pp. 63-79, 2017.—referred as Christensen et al.", "M. Burcea, "Online dynamic bin packing," Ph.D Dissertation; University of Liverpool, 2014.", and "L. Epstein and M. Levy, "Dynamic multi-dimensional bin-packing," Journal of Discrete Algorithms, vol. 8, no. 4, pp. 356-372, 2010.—referred as Epstein et al."). However, O3D-BPP with partial information in an industrial setting with robot packable constraints still remains very challenging. A further problem ensues when the boxes arriving are of mixed sizes with no underlying pattern.

The problem of limited information in the online setting is alleviated to some extent if a "look-ahead" is available, i.e., partial information may be available about the boxes in the immediate vicinity of the packer (e.g., "E. F. Grove, "Online bin packing with lookahead," in Proceedings of the ACM-SIAM Symposium on Discrete Algorithms, vol. 95, 1995, pp. 430-436."). The packing algorithm's job is to utilize this extra information and make complex decisions so that its efficiency can be improved. Existing heuristics for O3D-BPP lack this capability and thus, need to be adapted to the settings with look-ahead. According to various surveys, the space utilization of bins is the most important metric for defining the success of an automation algorithm. An automated packer does not have the flexibility of reshuffling that the humans have, and hence, is expected to perform worse. This results in more number of bins being used, and therefore, increases the cost.

SUMMARY

Embodiments of the present disclosure present technological improvements as solutions to one or more of the above-mentioned technical problems recognized by the inventors in conventional systems. For example, in one aspect, there is provided a processor implemented method for automated placement of objects in bins using look ahead information by virtual sorting and packing. The method comprises iteratively performing, for each object being received: receiving, via one or more hardware processors, (i) an object to be placed in a bin from a plurality of bins, (ii) a look ahead information corresponding to a set of subsequent objects to be placed in the bin or in at least one another bin among the plurality of bins; performing a virtual sorting of the object and the set of subsequent objects to be placed in the bin or in the at least one another bin among the plurality of bins based on the look ahead information to obtain a sorted list of objects; performing a virtual packing of one or more objects from the sorted list of objects in the bin or the another bin among the plurality of bins to obtain (i) a correct order of objects from the sorted list of objects along with a physical constraint associated with the bin or the at least one another bin among the plurality of bins, and (ii) a position of the one or more objects from the correct order of objects in the bin or in the at least one another bin among the plurality of bins; and placing, via the one or more hardware processors, the one or more objects in the bin or in the at least one another bin among the plurality of bins based on the determined position, until one of (i) a look ahead information is available, or (ii) a last object is placed in a corresponding bin.

In an embodiment, size and shape of one or more bins in the plurality of bins are identical to each other.

In an embodiment, size and shape of one or more bins in the plurality of bins are different from each other.

In an embodiment, size and shape of the object and the set of subsequent objects are identical to each other.

In an embodiment, size and shape of the object and the set of subsequent objects are different from each other.

In an embodiment, the bin and the at least one another bin are one of an empty bin or a partially filled bin.

In another aspect, there is provided a processor implemented system for automated placement of objects in bins using look ahead information by virtual sorting and packing. The system comprises: a memory storing instructions; one or more communication interfaces; and one or more hardware processors coupled to the memory via the one or more communication interfaces, wherein the one or more hardware processors are configured by the instructions to: iteratively perform, for each object being received: receiving (i) an object to be placed in a bin from a plurality of bins, (ii) a look ahead information corresponding to a set of subsequent objects to be placed in the bin or in at least one another bin among the plurality of bins; performing a virtual sorting of the object and the set of subsequent objects to be placed in the bin or in the at least one another bin among the plurality of bins based on the look ahead information to obtain a sorted list of objects; performing a virtual packing of one or more objects from the sorted list of objects in the bin or the another bin among the plurality of bins to obtain (i) a correct order of objects from the sorted list of objects along with a physical constraint associated with the bin or the at least one another bin among the plurality of bins, and (ii) a position of the one or more objects from the correct order of objects in the bin or in the at least one another bin among the plurality of bins; and placing the one or more objects in the bin or in the at least one another bin among the plurality of bins based on the determined position, until one of (i) a look ahead information is available, or (ii) a last object is placed in a corresponding bin.

In an embodiment, size and shape of one or more bins in the plurality of bins are identical to each other.

In an embodiment, size and shape of one or more bins in the plurality of bins are different from each other.

In an embodiment, size and shape of the object and the set of subsequent objects are identical to each other.

In an embodiment, size and shape of the object and the set of subsequent objects are different from each other.

In an embodiment, the bin and the at least one another bin are one of an empty bin or a partially filled bin.

In yet another aspect, there are provided one or more non-transitory machine-readable information storage mediums comprising one or more instructions which when executed by one or more hardware processors cause a method for automated placement of objects in bins using look ahead information by virtual sorting and packing. The method comprises iteratively performing, for each object being received: receiving, via one or more hardware processors, (i) an object to be placed in a bin from a plurality of bins, (ii) a look ahead information corresponding to a set of subsequent objects to be placed in the bin or in at least one another bin among the plurality of bins; performing a virtual sorting of the object and the set of subsequent objects to be placed in the bin or in the at least one another bin among the plurality of bins based on the look ahead information to obtain a sorted list of objects; performing a virtual packing of one or more objects from the sorted list of objects in the bin or the another bin among the plurality of bins to obtain (i) a correct order of objects from the sorted list of objects along with a physical constraint associated with the bin or the at least one another bin among the plurality of bins, and (ii) a position of the one or more objects from the correct order of objects in the bin or in the at least one another bin among the plurality of bins; and placing, via the one or more hardware processors, the one or more objects in the bin or in the at least one another bin among the plurality of bins based on the determined position, until one of (i) a look ahead information is available, or (ii) a last object is placed in a corresponding bin.

In an embodiment, size and shape of one or more bins in the plurality of bins are identical to each other.

In an embodiment, size and shape of one or more bins in the plurality of bins are different from each other.

In an embodiment, size and shape of the object and the set of subsequent objects are identical to each other.

In an embodiment, size and shape of the object and the set of subsequent objects are different from each other.

In an embodiment, the bin and the at least one another bin are one of an empty bin or a partially filled bin.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
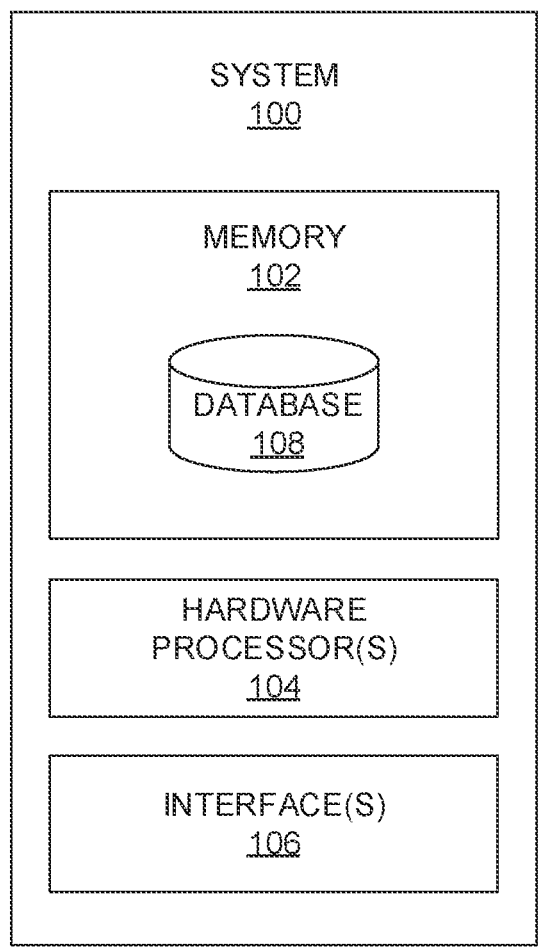
FIG. 1 depicts an exemplary system for automated placement of objects in bins using look ahead information by virtual sorting and packing, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 3B, where similar reference characters denote corresponding features consistently throughout the figures, there are shown preferred embodiments and these embodiments are described in the context of the following exemplary system and/or method.

FIG. 1 depicts an exemplary system 100 for automated placement of objects in bins using look ahead information by virtual sorting and packing, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information related to objects to be placed in bin(s). The database 108 further comprises look ahead information of subsequent objects with respect to current object under consideration, list of sorted objects, list of correct order of objects to be placed in various available bin(s), shape and size of bin(s), shape and size of objects, and the like. The memory 102 further comprises one or more techniques (e.g., virtual sorting technique(s), virtual packing technique(s), and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
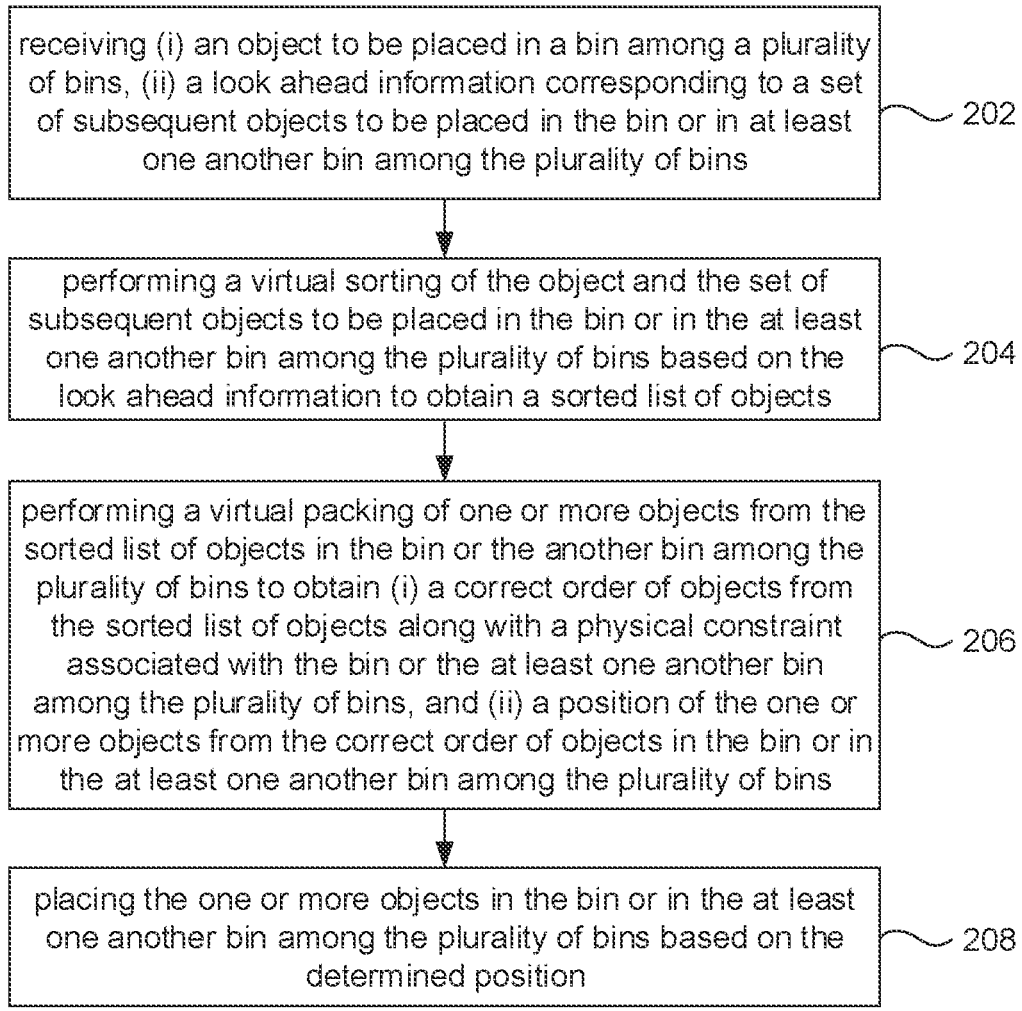
FIG. 2 depicts an exemplary flow chart illustrating a method for automated placement of objects in bins using look ahead information by virtual sorting and packing, using the system 100 of FIG. 1, in accordance with an embodiment of the present disclosure.

FIG. 2, with reference to FIG. 1, depicts an exemplary flow chart illustrating a method for automated placement of objects in bins using look ahead information by virtual sorting and packing, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. The steps 202 through 208 described herein are iteratively performed for each object being received until one least one of (i) a look ahead information (or last look ahead information) is available, or (ii) a last object (from a conveyor belt) is placed in a corresponding bin. In an embodiment of the present disclosure at step 202, the one or more hardware processors 104 receive (i) an object to be placed in a bin from a plurality of bins, (ii) a look ahead information corresponding to a set of subsequent objects to be placed in the bin or in at least one another bin among (or amongst) the plurality of bins. In other words, the system 100 receives (i) an object to be placed in a bin from a plurality of bins, (ii) a look ahead information corresponding to a set of subsequent objects to be placed in the bin or in at least one another bin from (or amongst) the plurality of bins. For instance, say Object 1 is an item to be placed in a bin or at least one another bin, and data related to objects 2, 3 and 4 constitutes the look ahead information. Another example may include, say Object 1 is an item to be placed in a bin or at least one another bin then the look ahead information may indicate that objects 2, 3 and 4 are to be packed following the placement of Object 1 in the bin. In an embodiment, size and shape of one or more bins in the plurality of bins are identical to each other. In another embodiment, the size and shape of one or more bins in the plurality of bins are different from each other. In an embodiment, the size and shape of the object and the set of subsequent objects are identical to each other. In another embodiment, the size and shape of the object and the set of subsequent objects are different from each other. Further, the bin and the at least one another bin are one of an empty bin, or a partially filled bin, in one example embodiment of the present disclosure. The above step 202 is better understood by way of following description.

In an automated packaging terminal, the arriving boxes are first scanned to capture their dimensions. Very large boxes (colloquially known as "uglies") are usually handled manually and/or by multiple robots. Present disclosure provides systems and method for online packaging of boxes (e.g., small/medium boxes) in large bins. Separating boxes based on dimensions has the following advantages. Firstly, it helps keep the number of bins low by avoiding the situation of an ugly arriving within a stream of small-medium boxes; secondly, the same robotic arm may not be suitable for picking boxes of highly varying dimensions. After the scanning process, the boxes are placed onto the "pick conveyor" for placement into the open bins by a robotic arm (placed at the end of the conveyor). In a conventional pick-up model, the bins can either be long-distance containers (LDCs), pallets, or roller-cages (RCs) depending upon their dimensions and use-cases. There is always a fixed number of open bins at a given time due to space constraints. Hence, before opening a new bin, one of the already open ones needs to be closed.

Depending on the pick conveyor's length, maximum box dimension to be packed, and inter-box gap, the number of boxes available to the robot in look-ahead is fixed. Many warehouses, manufacturers who are responsible for packaging use a fixed meter length-based pick conveyor where a look-ahead of up to specific boxes is possible. The packing algorithm decides which box to pick considering the available boxes on the pick conveyor and the current state of the bin and the robotic arm packs the box accordingly before a new box arrives (typically 5-6 seconds). The following assumptions are made by the present disclosure.

1. The conveyor belt is circular or oval so that the boxes circulate on it until they are placed.
2. The boxes are cuboidal and non-deformable.
3. Whenever a box is picked up, one more box gets added to the conveyor so that the look-ahead remains the same.
4. Volume (single box)<=Volume (single bin).

Additionally, there are some robotic packing constraints:

The number of orientations available for placing a box is limited by the degree of freedom (DOF) of the robotic arm. The following constraint was imposed during experiments by the present disclosure, wherein the box's largest dimension cannot be aligned along the arm's vertical axis.

To ensure stability and tight packing, a box is placed on top of another (inside the bin), if the surface area of the bottom box is greater or equal to that of the top box.

Once a box is placed inside a container, it cannot be reshuffled to a new position (imposed to ensure real-time and quick decision making to ensure unclogged chutes).

The robotic arm has a sensitivity of say x cm (e.g., 1 cm), and thus, any decimal dimensions are rounded off to the next cm.

Let L, B, H and $l_i$, $b_i$, and $h_i$ denote the length, breadth, and height of a bin and the $i^{th}$ box, respectively. The bins are chosen to be of uniform size. To impose the packability assumption, max $\{l_i, b_i, h_i\} \leq$ min$\{L, B, H\}$ are provided for every i. The front-left-bottom corner of the bin is treated as the origin and the interior of the bin is thus, treated as $\mathbb{R}^3$. For each box i placed inside a bin, the coordinates $(x_i, y_i, z_i)$ and $(\bar{x}_i, \bar{y}_i, \bar{z}_i)$ denote the front-left-bottom and the back right-top corners, respectively. These two points uniquely determine the position of a box inside a bin.

The objective of the O3D-BPP technique as implemented by the system and method of the present disclosure is to minimize N where N denotes the number of bins used for packing the boxes. However, since there is a steady online stream of boxes arriving on a given day, it is very difficult to estimate the number of bins required for optimal packing of these boxes a priori. Therefore, space utilization of the packed bins is taken as an alternate measure by the present disclosure. Formally, it is: Definition 1: The fill-rate efficiency of an algorithm (e.g., the O3D-BPP technique) for a closed bin is the ratio of total volume of all the boxes placed inside the bin to the volume of the bin. In other words, $$\text{fill} - \text{rate} = \frac{\text{total volume of boxes inside a bin}}{\text{volume of bin}} \times 100(\%) \quad (1)$$

For an experiment, the overall fill-rate efficiency of the algorithm is described for only closed bins, i.e., if NC bins are closed during the experiment, the overall efficiency of the experiment equals the average of the fill-rates of these NC bins. The fill-rate efficiency also acts as an indirect measure for asymptotic competitive (approximation) ratio (ACR), which is the metric typically used for evaluating bin-packing algorithms. ACR is a direct measure of how many bins are used to pack the boxes in a dataset (e.g., for dataset refer "Christensen et al.").

Referring to steps of FIG. 2, in an embodiment of the present disclosure at step 204, the one or more hardware processors 104 perform a virtual sorting of the object and the set of subsequent objects to be placed in the bin or in the at least one another bin among (or amongst) the plurality of bins based on the look ahead information to obtain a sorted list of objects. In other words, the system 100 performs virtual sorting of the object and the set of subsequent objects to be placed in the bin or in the at least one another bin from (or amongst) the plurality of bins based on the look ahead information to obtain the sorted list of objects. For instance, for the above-mentioned objects the sorted list of objects may be in the order say Object 3, Object 4, Object 1, and Object 2 respectively. At step 206, the one or more hardware processors 104 perform a virtual packing of one or more objects from the sorted list of objects in the bin or the another bin among (or amongst) the plurality of bins to obtain (i) a correct order of objects from the sorted list of objects along with a physical constraint (e.g., physical constraint may include bin dimension, ability of a specific bin to fit or accommodate a specific object, etc.) associated with the bin or the at least one another bin among (or amongst) the plurality of bins, and (ii) a position of the one or more objects from the correct order of objects in the bin or in the at least one another bin among (or amongst) the plurality of bins. For instance, Object 4, Object 3, Object 1, and Object 2 is the correct order of objects and their position identified would be say Object 4 to be placed in bin 1 below object x. Similarly, Object 3 to be placed in bin 1 above Object 4. It may be observed that after performing virtual packing, that objects 1 and 2 are to be positioned in left and right bottom corners of another bin say bin y. At step 208, the one or more hardware processors 104 place the one or more objects in the bin or in the at least one another bin among (or amongst) the plurality of bins based on the determined position. In other words, the system 100 performs places the one or more objects in the bin or in the at least one another bin from (or amongst) the plurality of bins based on the determined position. Based on the above positions being determined in step 206 (refer example above), the objects 1, 2, 3 and 4 are accordingly placed. The placement of objects may also be performed by one or more users once the virtual packing output is obtained using output from the virtual sorting, in one example embodiment of the present disclosure. Furthermore, in the context of the present disclosure, the system (or the one or more hardware processors 104) may be a robot, a humanoid, a drone, an unmanned aerial vehicle (UAV), or any other machine capable of carrying out complex series of actions as described herein. In another embodiment, the placement of objects in respective bins post virtual sorting and virtual packing may be performed with a combination of user(s)/ system. The above steps of virtual sorting of objects, virtual packing and placing of objects in various bins are better understood by way of following illustrative description:

The first approach virtual sorting is based on multi-objective optimization and combines the best features of several heuristics within the ambit of mixed integer linear programming (MILP) to produce superior solutions.

Objective function: The objective function tries to capture the essence of the standard heuristics as, $$\min\{\Sigma_{i \in P_L}(w_1(x_i+y_i)+w_2 \cdot \bar{z}_i+w_3 \Sigma_{j=1}^{B_B} p(i,j) \cdot k)\} \quad (2)$$

where $P_L$ denotes the set of boxes on the conveyor serving as the look-ahead; $\ell = |P_L|$; $p(i,j) \in \{0,1\}$ is such that $p(i,j)=1$ if and only if, box i is placed in bin j, and finally $N_B$ denotes the total number of currently open bins. Each currently open bin is given an index $j \in \{1, \ldots, N_B\}$ where a smaller index implies that the bin was opened earlier. The objective function comprises of three distinct components. Minimizing $x_i$ and $y_i$ for box i amounts to minimizing the spread of the boxes on the floor (column-building). Similarly, minimizing $\bar{z}_i$ aims to reduce the overall height of the packing arrangement (floor-building). The third component mimics first fit where earlier opened bins are preferred.

Remark 1: The first and second components in the objective function act as countermeasures to each other. The non-negative weights $w_1$ and $w_2$ denote which component is given more importance and these seem to depend on the ratio of the bin's height to its base area. For instance, if the bins in use have large height to surface area ratio; then $w_1$ should be greater than $w_2$, and vice versa. An analytic way to determine the optimal choice of weights corresponding to a height to surface area ratio is currently under consideration. On the other hand, $w_3$ is chosen very high (between 10 and 100) since the usual values of $x_i, y_i, \bar{z}_i$ in cms are 2 orders of magnitude higher than p(i,j).

1) Constraints: The algorithm/technique discussed herein converts O3D-BPP with look-ahead into a sequence of offline bin packing problems. It is assumed that at time t with $|P_L| = \ell$, $N_B$ bins are currently open, and N boxes already placed in the open bins. The offline (virtual) bin packing problem is to minimize the objective function (2) subject to packing constraints (described later) for the $N+\ell$ boxes to be placed in $N_B$ bins. However, since the packed boxes cannot be reshuffled, their corresponding variables are fixed to values from the previous run. For instance, at t=0, the objective is to pick and place one of the first $\ell$ boxes in the first $N_B$ bins. After the box is placed at t=1, one more box gets added to the conveyor. Thus, at t=1, the optimization problem consists of $\ell+1$ (look-ahead and one already packed) boxes to be placed into $N_B$ open bins. The variables corresponding to the box already packed are fixed to the values obtained at t=0. This procedure is repeated iteratively until all the boxes are packed. Noted that since $\ell$ and $N_B$ are fixed, the size of the problem is bounded.

The constraints for this technique can be divided into three sets—geometric constraints, vertical stability constraints, and efficient packing constraints (these constraints may also be referred as one or more physical constraints and interchangeably used herein). To maintain the brevity of present disclosure, only a brief description of the most important geometric and vertical stability constraints is provided for the sake of completeness (refer [13]). For a single iteration of this technique, the parameters $\ell$, N, and $N_B$ are defined previously. Let $P_B = \{1, \ldots, N\}$ denote the set of boxes already placed, and $P_L = \{N+1, \ldots, N+\ell\}$ denote the set of boxes in the look-ahead, respectively. Similarly, the sets $$P \triangleq P_B \cup P_L$$

and $O_B = \{1, \ldots, N_B\}$ denotes the set of boxes and bins used in the current iteration. Every time a new bin is opened, an old bin is closed, and the bin indices are reset. For all i, k ∈ P; j ∈ {1, ..., $N_B$}; and s ∈ {x, y, z} (coordinates), let $$p_{ij} = \begin{cases} 1 & \text{if box } i \text{ is placed in container } j, \\ 0 & \text{otherwise,} \end{cases}$$

$$u_j = \begin{cases} 1 & \text{if container } j \text{ is used,} \\ 0 & \text{otherwise,} \end{cases}$$

-continued $$s_{il}^p = \begin{cases} 1 & \text{if box } i \text{ is on the right of box } k (\bar{s}_k \leq s_i), \\ 0 & \text{otherwise } (s_i \leq \bar{s}_k). \end{cases}$$

For each i ∈ P and for every a, b ∈ {x, y, z}, $$r_{iab} = \begin{cases} 1 & \text{if side } b \text{ of box } i \text{ is } a\text{-axis of the bin,} \\ 0 & \text{otherwise.} \end{cases}$$

for every i ∈ $P_B \cup P_L$ and for each a, b ∈ {1,2,3}. The variable, $r_{iab}$ checks the degree of freedom of the robotic arm, which is used to place the box in the containers. For example, if the length of the box if kept along the length of the container then $r_{ixx} = 1$.

Geometric constraints. These ensure a box is always placed within a bin and all feasible orientations are respected:

$$\Sigma_{i \in P_B \cup P_L} \leq u_j, \Sigma_{j=1}^B p_{ij}, s_i' \leq \Sigma_{j=1}^B L_j p_{ij},$$

$$\bar{x}_i - x_i = r_{ixx}l_i + r_{ixy}b_i + r_{ixz}h_i,$$

$$\bar{y}_i - y_i = r_{iyx}l_i + r_{iyy}b_i + r_{iyz}h_i,$$

$$\bar{z}_i - z_i = r_{izx}l_i + r_{izy}b_i + r_{izz}h_i,$$

$$\Sigma_b r_{iab} = 1, \Sigma_a r_{iab} = 1, \quad (3)$$

for all i ∈ $P_B \cup P_L$, j ∈ $O_B$, s, a, b ∈ {x,y,z}. The $2^{nd}$ to $4^{th}$ lines in (3) describe the possible orientations of a box before placing it. In case restrictions are to be imposed, corresponding r should be set equal to 0.

Vertical stability constraints. These constraints ensure that the system 100 have a stable packing arrangement such that the box being placed gets adequate support at the bottom and does not float in the air. This is ensured by placing a box either on the floor of the container or in a location where at least 3 vertices of the base of the box are supported by underlying boxes. For mathematical details—refer "C. Paquay, M. Schyns, and S. Limbourg, "A mixed integer programming formulation for the three-dimensional bin packing problem deriving from an air cargo application," International Transactions in Operational Research, vol. 23, no. 1-2, pp. 187-213, 2016.". Constraints for efficient packing (CEP)—referred as Paquay et al."). These constraints ensure that there are no gaps (or "holes") in the packing arrangement, i.e., whenever a new box is placed, two of its surfaces should either be touching the already placed boxes (along the X-Y plane) or the walls of the bin. The following variables are used for these constraints:

$$d_{ikc} = \begin{cases} 1 & \text{if box } i \text{ is in contact with box } k \text{ along } c \text{ axis,} \\ 0 & \text{otherwise,} \end{cases}$$

$$d_{ijw}^w = \begin{cases} 1 & \text{if box } i \text{ is in contact with wall } e \text{ of container } j, \\ 0 & \text{otherwise,} \end{cases}$$

for all i ∈ $P_L$, k ∈ P, j ∈ $O_B$, c ∈ {x, y} and w ∈ {1, ..., 4}. Restricting the attention to the X-Y plane, it is observed that there are 4 possible walls of the bin with which a box can make contact and hence let w ∈ {1, ..., 4}. The constraints are formulated as:

$$c_i \leq \bar{c}_k + (1 - d_{ikc})D, c_i \leq \bar{c}_k(d_{ikc} - 1)D,$$

$$c_i \leq (m-1)D + (1 - d_{ijp}^w)D$$

$$c_i \leq (m-1)D + (d_{ijp}^w - 1)D,$$

$$c_i \leq mD + (1 - d_{ijq}^w)D, \bar{c}_i \leq mD + (d_{ijq}^w - 1)D, \quad (4)$$

for every $i \in P_L$, $k \in P$, $j \in O_B$, $c \in \{x,y\}$. For c=x; D=L, m=j, p=1, and q=3 whereas, for c=y; D=B, m=1, p=3, and q=4, respectively. In addition, the following set of constraints are needed:

$$\Sigma_{i \in P_L} \Sigma_{j=1}^{NB}(d_{ij1}{}^w+d_{ij3}{}^w)+\Sigma_{i \in P_L}\Sigma_{k \in P_B \cup P_L} d_{ikx} \le 1,$$

$$\Sigma_{i \in P_L} \Sigma_{j=1}^{NB}(d_{ij2}{}^w+d_{ij4}{}^w)+\Sigma_{i \in P_L}\Sigma_{k \in P_B \cup P_L} d_{iky} \le 1,$$

$$\Sigma_{i \in P_L}\Sigma_{j=1}^{NB}\Sigma_{e=1} d_{ije}{}^w + \Sigma_{i \in P_L}{}^\ell \Sigma_{k \in P_B \cup P_l} \Sigma_{c \in \{x,y\}} d_{ikc} \ge 2. \quad (5)$$

In addition to ensuring CEP, there is also a need to remove redundancies within the formulation which may arise from counting the same surface twice if it touches tow more boxes. This is enforced by equation (5).

Algorithm: For a box B, let $Loc_{P_L}$ define the location coordinates $(x_B, y_B, z_B)$ calculated by following the packing algorithm steps. For a set $$\mathcal{B} \triangleq \{B_1, \dots, B_n\},$$

$Loc_B$ denotes the collection $\{Loc_{B_1}, \dots, Loc_{B_n}\}$. Briefly, the steps of above technique are mentioned below:

1) First try to find $Loc_{P_L}$ by minimizing (2) subject to (3)-(5). If $Loc_{P_L}$ is found, choose one box from $P_L$ using a selection heuristic (described later), pick it and place it.
2) Continue repeating the above procedure by removing the boxes farthest from the arm from $P_L$ (i.e., decreasing $\ell$ by one) until $Loc_{P_L}$ is found or $|P_L|=1$.
3) If $|P_L|=1$, evaluate each box on the conveyor individually to find feasible locations. If they are found, go for box selection and placement. Else, close the bin with the highest fill-rate, open a new bin and repeat steps 1-3.

The algorithm terminates every time provided there are enough bins. If there is no feasible location in the existing bins, a new bin is opened (after closing an earlier bin) and this ensures that the feasible location for at least one of the boxes is always found (in the worst case, it's in the new bin).

Box selection Heuristic: Whenever $Loc_B$ for multiple $B \in P_L$ are found, the robotic arm has to choose one among them. One way to do this is to select the box that yields minimal increase in $w_1(x_i+y_i)+w_2 \cdot \bar{z}_i$ (to align with the objective) and can be supported solely by the boxes in $P_B$ (does not require support from $P_L$) to ensure stability.

The system and method now present a framework that can adapt standard bin packing algorithms (both offline and online) to the O3D-BPP with look-ahead using the concept of virtual packing. Below is the pseudo code or algorithm for the technique described herein:

---

Algorithm 1: $(B_i, Loc_B) = ALGO(P_B, P_L, Loc_{P_B})$

Set $\ell = |P_L|$ and count = 1

Set $\tilde{P}_B = P_B$ and $Loc_{\tilde{P}_B} = Loc_{P_B}$ $\tilde{P}_L \triangleq \{B_1, \dots B_\ell\} = SORT(P_L)$ while count $\le \ell$ do $Loc_{B_{count}} = PACKRULE(\tilde{P}_B, Loc_{\tilde{P}_B}, B_{count})$ Update $\tilde{P}_B = \tilde{P}_B \cup B_{count}$ Update $Loc_{\tilde{P}_B} = Loc_{\tilde{P}_B} \cup Loc_{B_{count}}$ count = count + 1 end while

---

Choose $B_i \in \tilde{P}_L$ using BOXPACK heuristic

Pick $B_i$, place it at $Loc_{B_i}$, and update $P_B$, $Loc_{P_B}$ and $P_L$

The following sub-routines are needed for its execution:
SORT: Create a virtual sorted list of boxes in $P_L$ according to a pre-specified rule; for e.g., decreasing order of volume or area (ties broken by decreasing height).
PACKRULE: Calculate $Loc_B$ using ALGO's packing rule. For e.g., prefer earliest opened bin in First-fit FF) or bin with maximum fill-rate in best-fit (BF).
BOXPACK: Pick a box B for final packing based on: (i) stand-alone stability: $Loc_B$ should be supported by boxes in $P_B$ and the bin (not requiring any support from $P_L$); and (ii) box-selection rule in case of multiple stand-alone stable boxes.

The above algorithm as implemented by the system 100 and the method of the present disclosure is worked by converting a problem of $\ell$ look-ahead into a sequence of $\ell$ problems of look-ahead 1. However, the solution of each problem in the sequence is dependent on the former. This is achieved by a virtual update of bin state after every iteration of PACKRULE by placing the box under consideration in the current iteration at its feasible location. Note that this step is virtual, i.e., this does not happen in reality on the conveyor. This virtual packing as described in step 206 enables the algorithm to utilize the information about the boxes in $P_L$. Standard bin packing heuristics like Firstfit (FF) or Best-fit (BF) lack this step and hence are not able to utilize the extra information from $P_L$. The present disclosure empirically shows that the use of virtual packing results in much better performance for algorithms than without it.

The system and method apply the above-mentioned technique to algorithm, first-fit (FF), best-fit (BF) (using extreme points (e.g., "T. G. Crainic, G. Perboli, and R. Tadei, "Extreme point-based heuristics for three-dimensional bin packing," INFORMS Journal on Computing, vol. 20, no. 3, pp. 368-384, 2008."—also referred as Crainic et al.), and Jampack (using corner points (e.g., "M. Agarwal, S. Biswas, C. Sarkar, S. Paul, and H. S. Paul, "Jampacker: An efficient and reliable robotic bin packing system for cuboid objects." IEEE Robotics and Automation Letters, vol. 6, no. 2, pp. 319-326, 2020."—also referred as Agarwal et al.) to yield object packing, O-FF, O-BF, and O-JP, respectively. It should be noted that while FF and BF are online heuristics, they are not equipped to deal with additional information in the form of look-ahead. On the other hand, first-fit decreasing (FFD) and best-fit decreasing (BFD) use pre-sorted list of boxes which arrive one by one; and thus, are not online heuristics (e.g., "J. Balogh, J. Bekesi, G. Dosa, L. Epstein, and A. Levin, "A new and improved algorithm for online bin packing," in 26th Annual European Symposium on Algorithms. Schloss Dagstuhl-Leibniz-Zentrum fuer Informatik, 2018, pp. 5:1-5:14."—referred as Balogh et al.).

By applying the framework to algorithm 1, the system and method obtain a real-time deployable algorithm: wherein three subroutines in this algorithm are:
SORT: Sort boxes in $P_L$ by decreasing volumes with ties broken by decreasing heights.

PACKRULE: Evaluate $Loc_{B_{count}}$ for $B_{count} \in P_L$ by minimizing (2) subject to constraints described earlier.
The input parameters are $\tilde{P}_B$ and $Loc_{\tilde{P}_B}$.
BOXPACK: Select and pack one box in $P_B$ satisfying stand-alone stability and selection rule described earlier.

Since the above real-time deployable algorithm decomposes a problem of look-ahead $\ell$ to a sequence of $\ell$ problems with look-ahead of size 1 (with dependencies between them), the growth of computation time/box grows linearly for this compared to exponential for earlier technique mentioned above. To speed up real-time deployable algorithm further, the constraints on efficient packing (CEP) are dropped, since they do not offer any distinct advantage for a problem with look-ahead of size 1. The objective function (which captures floor and column building) and the constraints are enough to ensure that the packing arrangement is tight without any gaps.

Experiments and Results

System and method of the present disclosure compare the performance of framework and algorithm as implemented herein against two baseline heuristics—First-fit (FF) and Best-fit (BF)) along with their adaptation with object packing (referred as OPack), i.e., OPack-FF (O-FF) and OPack-BF(O-BF). Additionally, these were also compared with OPack adaptation of Jampack (O-JP), which is a state-of-the-art offline bin packing algorithm. Experiments were performed with two types of data.

1. Industrial data: This data contained dimensions of boxes from their sorting center. 100 collections of boxes were generated by random sampling (25 for each industrial bin type): Long Distance Container (LDC)—120×80×80 cm³, Roller-cage (RC)—120×70×160 cm³, Pallet (PAL)—220×120×80 cm³, and Equal—80×80×80 cm³. The total volume of each collection would fill 4 bins. The number of boxes in collections varied according to the bin dimensions. In addition, the box dimensions are not integers and hence, a ceiling function was used while placing the boxes. However, the fill-rate was calculated based on actual values.
2. Synthetic data: 30 collections of boxes were generated such that each collection would optimally fill 10 bins with dimensions 80×45×45 cm³. The box dimensions are integers; thus, accurate placement can be achieved. The boxes in each collection were sent on the conveyor in a completely random order. All 6 rotations were allowed, and at any time, up to 3 bins were open (bin with highest fill-rate is closed in case a new bin is required to be opened).

Results:

The experiments were run on an 8-core laptop with i7-6820HQ processor (2.7 GHz speed/16 GB memory). The weights $w_1$, $w_2$, and $w_3$ in Equation (2) were set to 1, 1, and 100, respectively, for MPack (also referred as Present disclosure's algorithm/algo Present disclosure's algorithm version1/v1 and interchangeably used herein) and MPackLite (also referred as Present disclosure's algorithm/algo lite or Present disclosure's algorithm version2/v2 and interchangeably used herein). The results for mean fill-rates (MFRs) and mean computation time/box are captured in Table 1. Whenever experiments were stopped either due to enormous computation time or lack of ability to provide new information, their entries are marked using "—". The robotic arm is assumed to have a resolution of 1 cm and hence, decimal box dimensions are rounded off to the next integer for placement.

Figure 3A:
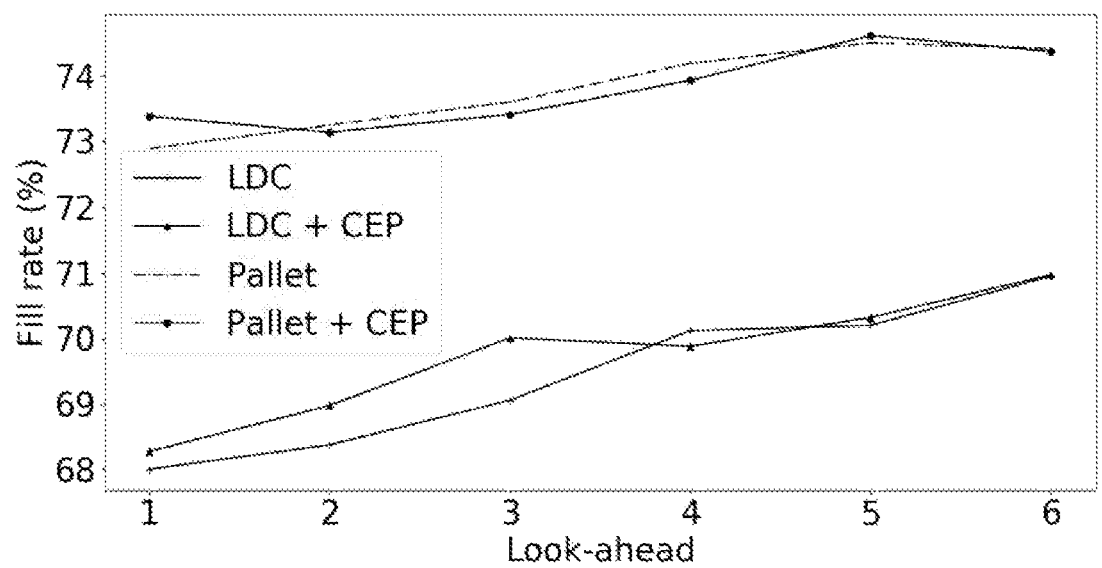
FIG. 3A depicts a graphical representation illustrating a comparison of computation times for long-distance containers (LDCs), in accordance with an embodiment of the present disclosure.
Figure 3B:
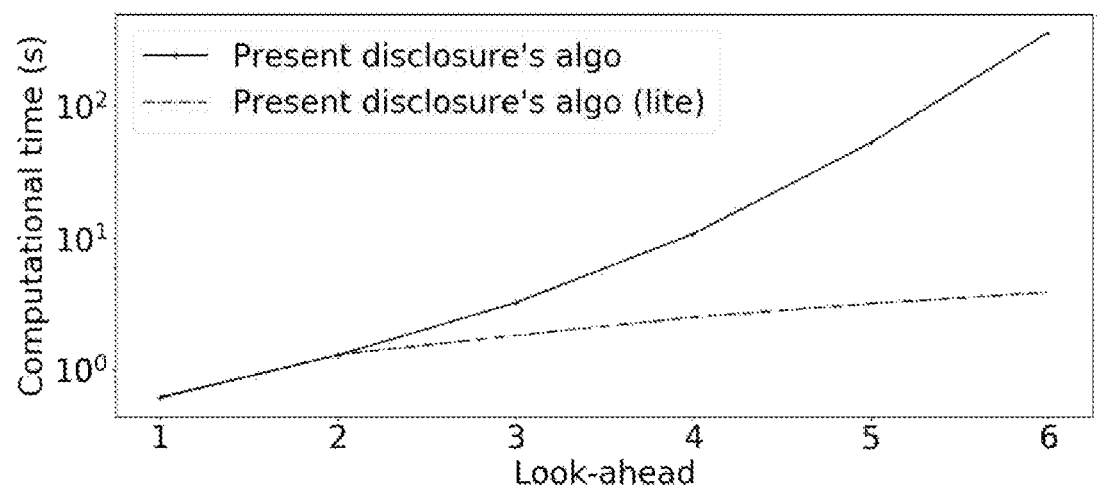
FIG. 3B depicts a graphical representation illustrating effect of constraints on efficient packing (CEP), in accordance with an embodiment of the present disclosure.

The framework described and implemented by the present disclosure performed the best, at the cost of increased computation time; and hence, is used for benchmarking. Among the others, algorithm described herein performed the best against heuristics (for all datasets and bin-sizes); however, its computation time is between 10 and 30 times higher. However, all the computation times for algorithm are within the bounds of robot operation (5-6 seconds/box) and hence, it can be deployed in real-time. The MFRs for synthetic datasets is higher than real datasets for all algorithms because its boxes have integral dimensions. Also, it can be observed that while algorithm performs marginally lower than framework in terms of MFRs; its computation time growth is linear compared to exponential for algorithm (FIG. 3A). Additionally, as FIG. 3B shows, CEPs do not offer any advantage to algorithm. More specifically, FIG. 3A, with reference to FIGS. 1-2, depicts a graphical representation illustrating a comparison of computations times for long-distance containers (LDCs), in accordance with an embodiment of the present disclosure. FIG. 3B, with reference to FIGS. 1-2, depicts a graphical representation illustrating effect of constraints on efficient packing (CEP), in accordance with an embodiment of the present disclosure.

A comparison between FF/BF and O-FF/O-BF reveals the benefits of using Object Packing (OPack) with virtual packing. While the mean fill-rates (MFRs) for FF and BF are stagnant with increasing $\ell$; the same show an increasing trend for O-FF and O-BF. For instance, for the case of Pallet: the MFR of FF and O-FF vary from 67.43% to 67.69% and from 67.43% to 70.24%, respectively, from $\ell = 1$ to $\ell = 5$ (resulting in a relative improvement of 4.2% for O-FF over FF). Similar behavior can be observed across bin dimensions. This clearly shows how virtual packing helps utilize information from PL. On the other hand, due to the extra steps of virtual packing, the computation time/box also increases with respect to $\ell$. Table 1 shows that O-FF performs better than O-BF and O-JP. This is due to the setup where the bins opened earlier with highest-fill rates have to be closed for new ones to be opened. Thus, preferring the earliest opened bins (rule of FF) yields highest efficiency. One can conjecture that if all the available bins are opened concurrently, then O-BF and O-FF would have similar efficiencies since ACR(FF)=ACR(BF)=1.7.

TABLE 1

| | | FF | | O-FF | | BF | | O-BF | | O-JP | | MPL | | MP | |
|---|---|---|---|---|---|---|---|---|---|---|---|---|---|---|---|
| | Bin | FR(%) | T(s) | FR(%) | T(s) | FR(%) | T(s) | FR(%) | T(s) | FR(%) | T(s) | FR(%) | T(s) | FR(%) | T(s) |
| 1 | SYN | — | — | 68.71 | 0.049 | — | — | 65.45 | 0.062 | 64.57 | 0.031 | 73.11 | 1.045 | 73.92 | 0.35 |
| | EQ | 59.67 | 0.036 | 59.67 | 0.035 | 59.04 | 0.038 | 59.04 | 0.4 | 49.77 | 0.017 | 67.06 | 0.35 | 65.3 | 0.88 |
| | PAL | 67.43 | 0.099 | 67.43 | 0.102 | 65.17 | 0.113 | 65.17 | 0.115 | 69.13 | 0.053 | 72.89 | 0.55 | 73.38 | 1.21 |
| | RC | 49.51 | 0.057 | 49.51 | 0.057 | 43.47 | 0.062 | 43.47 | 0.064 | 31.71 | 0.039 | 57.45 | 0.67 | 57.57 | 0.9 |
| | LDC | 64.91 | 0.045 | 64.91 | 0.044 | 62.71 | 0.05 | 62.71 | 0.05 | 60.77 | 0.023 | 68.71 | 0.359 | 68.26 | 0.62 |
| 2 | SYN | — | — | 69.99 | 0.052 | — | — | 66.49 | 0.073 | 65.22 | 0.028 | 74.05 | 2.04 | 75.03 | 0.615 |
| | EQ | 60.33 | 0.036 | 59.75 | 0.039 | 57.74 | 0.038 | 60.01 | 0.47 | 51.68 | 0.016 | 66.39 | 0.68 | 68.54 | 1.45 |
| | PAL | 67.99 | 0.097 | 68.27 | 0.09 | 64.86 | 0.113 | 66.05 | 0.119 | 69.48 | 0.046 | 73.25 | 1.06 | 73.88 | 2.93 |

TABLE 1-continued

| | | FF | | O-FF | | BF | | O-BF | | O-JP | | MPL | | MP | |
|---|---|---|---|---|---|---|---|---|---|---|---|---|---|---|---|
| | Bin | FR(%) | T(s) | FR(%) | T(s) | FR(%) | T(s) | FR(%) | T(s) | FR(%) | T(s) | FR(%) | T(s) | FR(%) | T(s) |
| | RC | 50 | 0.056 | 50.17 | 0.053 | 43.57 | 0.063 | 44.5 | 0.07 | 32.42 | 0.032 | 58.1 | 1.29 | 59.91 | 4.02 |
| | LDC | 64.11 | 0.045 | 65.67 | 0.044 | 63.31 | 0.05 | 64.21 | 0.054 | 62.11 | 0.02 | 68.38 | 0.71 | 69.99 | 1.29 |
| 3 | SYN | — | — | 70.44 | 0.06 | — | — | 67.57 | 0.09 | 65.03 | 0.029 | 74.83 | 3.075 | 75.95 | 1.33 |
| | EQ | 60.55 | 0.036 | 62.6 | 0.048 | 58.67 | 0.038 | 60.96 | 0.59 | 51.24 | 0.017 | 67.56 | 1.03 | 69.74 | 3.08 |
| | PAL | 67.33 | 0.097 | 68.83 | 0.099 | 65.62 | 0.113 | 66.76 | 0.139 | 69.12 | 0.47 | 73.6 | 1.53 | 73.53 | 9.73 |
| | RC | 50.15 | 0.055 | 51.67 | 0.066 | 43.7 | 0.062 | 46.19 | 0.089 | 34.37 | 0.033 | 57.94 | 1.93 | 61.33 | 17.14 |
| | LDC | 65.94 | 0.045 | 67.42 | 0.05 | 63.55 | 0.05 | 64.71 | 0.067 | 61.84 | 0.021 | 69.06 | 1.159 | 70.91 | 3.22 |
| 4 | SYN | — | — | 71.28 | 0.075 | — | — | 68.49 | 0.112 | 64.77 | 0.03 | 75.4 | 4.16 | 76.96 | 3.35 |
| | EQ | 59.58 | 0.036 | 61.59 | 0.057 | 59.01 | 0.038 | 61.4 | 0.7 | 50.16 | 0.018 | 67.84 | 1.4 | 70.77 | 7.19 |
| | PAL | 68.26 | 0.097 | 69.67 | 0.115 | 64.92 | 0.113 | 67.37 | 0.167 | 68.81 | 0.052 | 74.19 | 2.54 | 74.44 | 31.24 |
| | RC | 50.3 | 0.057 | 51.7 | 0.083 | 44.45 | 0.062 | 47.6 | 0.109 | 34.77 | 0.036 | 59.38 | 2.54 | 62.52 | 58.92 |
| | LDC | 66.21 | 0.045 | 68.06 | 0.063 | 63.34 | 0.05 | 67.11 | 0.082 | 61.57 | 0.022 | 70.12 | 1.507 | 71.29 | 10.71 |
| 5 | SYN | — | — | 71.74 | 0.09 | — | — | 38.96 | 0.137 | 64.51 | 0.033 | 75.99 | 5.06 | 77.93 | 14.64 |
| | EQ | 61.17 | 0.036 | 62.85 | 0.065 | 59.12 | 0.038 | 62.55 | 0.084 | 51.64 | 0.019 | 69.18 | 1.78 | 71.73 | 15.38 |
| | PAL | 68.44 | 0.097 | 70.24 | 0.13 | 65.16 | 0.113 | 67.23 | 0.191 | 68.71 | 0.057 | 74.5 | 2.9 | 74.34 | 133.6 |
| | RC | 51 | 0.057 | 52.89 | 0.1 | 44.26 | 0.062 | 48.57 | 0.131 | 34.98 | 0.038 | 59.63 | 3.21 | — | — |
| | LDC | 65.89 | 0.045 | 69.18 | 0.075 | 63.48 | 0.05 | 66.67 | 0.097 | 61.38 | 0.025 | 70.2 | 1.877 | 72.41 | 52.55 |

In the present disclosure, a generalized framework OPack has been presented for solving the online robotic bin-packing problem in an automated sorting center setup with partial information about upcoming boxes. The framework OPack can adapt baseline algorithms (online or offline) to this setup by extracting and utilizing the extra information in the look-ahead; thus, improving the algorithms' performance. Applying OPack to integer-programming method MPack (also referred as Present disclosure's algorithm/algo Present disclosure's algorithm version1/v1 and interchangeably used herein) yields MPackLite (also referred as Present disclosure's algorithm/algo lite or Present disclosure's algorithm version2/v2 and interchangeably used herein) which is receding horizon MILP-based algorithm which performs superior to baseline heuristic approaches while maintaining a computational time within bounds of robot operation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   iteratively performing, for each object being received:
   receiving, via one or more hardware processors, (i) an object to be placed in a bin from a plurality of bins, (ii) a look ahead information corresponding to a set of subsequent objects to be placed in the bin or in at least one another bin among the plurality of bins;
   performing, via the one or more hardware processors, a virtual sorting of the object and the set of subsequent objects to be placed in the bin or in the at least one another bin among the plurality of bins based on the look ahead information to obtain a sorted list of objects;
   performing, via the one or more hardware processors, a virtual packing of one or more objects from the sorted list of objects in the bin or the another bin among from the plurality of bins to obtain (i) a correct order of objects from the sorted list of objects along with a physical constraint associated with the bin or the at least one another bin among the plurality of bins, and (ii) a position of the one or more objects from the correct order of objects in the bin or in the at least one another bin from the plurality of bins; and
   placing, via the one or more hardware processors, the one or more objects in the bin or in the at least one another bin from the plurality of bins based on the determined position,
   until one of (i) a look ahead information is available, or (ii) a last object is placed in a corresponding bin.

2. The processor implemented method of claim 1, wherein size and shape of one or more bins in the plurality of bins are identical to each other.

3. The processor implemented method of claim 1, wherein size and shape of one or more bins in the plurality of bins are different from each other.

4. The processor implemented method of claim 1, wherein size and shape of the object and the set of subsequent objects are identical to each other.

5. The processor implemented method of claim 1, wherein size and shape of the object and the set of subsequent objects are different from each other.

6. The processor implemented method of claim 1, wherein the bin and the at least one another bin are one of an empty bin, or a partially filled bin.

7. A system, comprising:
   a memory storing instructions;
   one or more communication interfaces; and
   one or more hardware processors coupled to the memory via the one or more communication interfaces, wherein the one or more hardware processors are configured by the instructions to:
   iteratively perform, for each object being received:
   receiving (i) an object to be placed in a bin from a plurality of bins, (ii) a look ahead information corresponding to a set of subsequent objects to be placed in the bin or in at least one another bin among the plurality of bins;
   performing a virtual sorting of the object and the set of subsequent objects to be placed in the bin or in the at least one another bin among the plurality of bins based on the look ahead information to obtain a sorted list of objects;
   performing a virtual packing of one or more objects from the sorted list of objects in the bin or the another bin among the plurality of bins to obtain (i) a correct order of objects from the sorted list of objects along with a physical constraint associated with the bin or the at least one another bin among the plurality of bins, and (ii) a position of the one or more objects from the correct order of objects in the bin or in the at least one another bin among the plurality of bins; and
   placing the one or more objects in the bin or in the at least one another bin among the plurality of bins based on the determined position,
   until one of (i) a look ahead information is available, or (ii) a last object is placed in a corresponding bin.

8. The system of claim 7, wherein size and shape of one or more bins in the plurality of bins are identical to each other.

9. The system of claim 7, wherein size and shape of one or more bins in the plurality of bins are different from each other.

10. The system of claim 7, wherein size and shape of the object and the set of subsequent objects are identical to each other.

11. The system of claim 7, wherein size and shape of the object and the set of subsequent objects are different from each other.

12. The system of claim 7, wherein the bin and the at least one another bin are one of an empty bin, or a partially filled bin.

13. One or more non-transitory machine-readable information storage mediums comprising one or more instructions which when executed by one or more hardware processors cause a method for automated placement of objects in bins using look ahead information by virtual sorting and packing, the method comprising:
   iteratively performing, for each object being received:
   receiving, via the one or more hardware processors, (i) an object to be placed in a bin from a plurality of bins, (ii) a look ahead information corresponding to a set of subsequent objects to be placed in the bin or in at least one another bin among the plurality of bins;
   performing a virtual sorting of the object and the set of subsequent objects to be placed in the bin or in the at least one another bin among the plurality of bins based on the look ahead information to obtain a sorted list of objects;
   performing a virtual packing of one or more objects from the sorted list of objects in the bin or the another bin among the plurality of bins to obtain (i) a correct order of objects from the sorted list of objects along with a physical constraint associated with the bin or the at least one another bin among the plurality of bins, and (ii) a position of the one or more objects from the correct order of objects in the bin or in the at least one another bin among the plurality of bins; and
   placing, via the one or more hardware processors, the one or more objects in the bin or in the at least one another bin among the plurality of bins based on the determined position, until one of (i) a look ahead information is available, or (ii) a last object is placed in a corresponding bin.

14. The one or more non-transitory machine-readable information storage mediums of claim 13, wherein size and shape of one or more bins in the plurality of bins are identical to each other.

15. The one or more non-transitory machine-readable information storage mediums of claim 13, wherein size and shape of one or more bins in the plurality of bins are different from each other.

16. The one or more non-transitory machine-readable information storage mediums of claim 13, wherein size and shape of the object and the set of subsequent objects are identical to each other.

17. The one or more non-transitory machine-readable information storage mediums of claim 13, wherein size and shape of the object and the set of subsequent objects are different from each other.

18. The one or more non-transitory machine-readable information storage mediums of claim 13, wherein the bin and the at least one another bin are one of an empty bin, or a partially filled bin.

\* \* \* \* \*